(12) United States Patent
Gehring et al.

(10) Patent No.: US 9,191,567 B2
(45) Date of Patent: Nov. 17, 2015

(54) CAMERA SYSTEM AND METHOD OF DETECTING A STREAM OF OBJECTS

(71) Applicant: SICK AG, Waldkirch (DE)

(72) Inventors: Roland Gehring, Waldkirch (DE); Jurgen Reichenbach, Waldkirch (DE)

(73) Assignee: SICK AG, Waldkirch (DE)

( * ) Notice: Subject to any disclaimer, the term of this patent is extended or adjusted under 35 U.S.C. 154(b) by 268 days.

(21) Appl. No.: 13/936,465

(22) Filed: Jul. 8, 2013

(65) Prior Publication Data
US 2014/0036135 A1 Feb. 6, 2014

(30) Foreign Application Priority Data
Jul. 31, 2012 (EP) ..................................... 12178684

(51) Int. Cl.
*H04N 5/232* (2006.01)
*G06K 7/10* (2006.01)

(52) U.S. Cl.
CPC ........ *H04N 5/23212* (2013.01); *G06K 7/10722* (2013.01); *G06K 7/10861* (2013.01)

(58) Field of Classification Search
CPC .......... H04N 5/23212; G06K 7/10722; G06K 7/10861
USPC ................... 348/135, 140, 142, 175, 18, 187, 348/E17.006
See application file for complete search history.

(56) References Cited

U.S. PATENT DOCUMENTS

| | | | | |
|---|---|---|---|---|
| 5,960,098 A | * | 9/1999 | Tao | B07C 5/3422 348/89 |
| 7,151,606 B2 | * | 12/2006 | Taniguchi | G01N 21/359 250/330 |
| 8,008,641 B2 | * | 8/2011 | Harris | G01J 3/46 250/208.1 |
| 9,046,498 B2 | * | 6/2015 | Hong | G01N 21/9501 |
| 2008/0055457 A1 | * | 3/2008 | Nakahara | G02B 7/08 348/335 |
| 2009/0051699 A1 | * | 2/2009 | Posa | H04N 13/0278 345/619 |
| 2014/0055662 A1 | * | 2/2014 | Torabi | H04N 5/23212 348/345 |

FOREIGN PATENT DOCUMENTS

| | | |
|---|---|---|
| DE | 10207538 A1 | 9/2003 |
| EP | 1363228 A | 11/2003 |
| EP | 1645839 A | 4/2006 |
| EP | 2133816 A | 12/2009 |
| WO | 03044586 A | 5/2003 |

OTHER PUBLICATIONS

European Search Report in the Counterpart patent Application No. 12178684.2, (13) thirteen pages.

* cited by examiner

*Primary Examiner* — Hung Lam
(74) *Attorney, Agent, or Firm* — Nath Goldberg & Meyer; Jerald L. Meyer

(57) ABSTRACT

A camera system (10), in particular a camera-based code reading system, for detecting a stream of objects (14) moved relative to the camera system (14) is provided, wherein the camera system (10) has a plurality of detection units (18) each having an image sensor and a focusing unit (20) as well as at least one control unit (30, 32) to set the focal positions of the detection units (18) in a complementary manner on a simultaneous detection of a plurality of objects (14) such that as many objects (14) as possible are detected in focus by at least one detection unit (18). In this respect, an evaluation unit (32) is provided which is configured to compose image data of the detection units (18) to form a common image.

17 Claims, 3 Drawing Sheets

Figure 1:
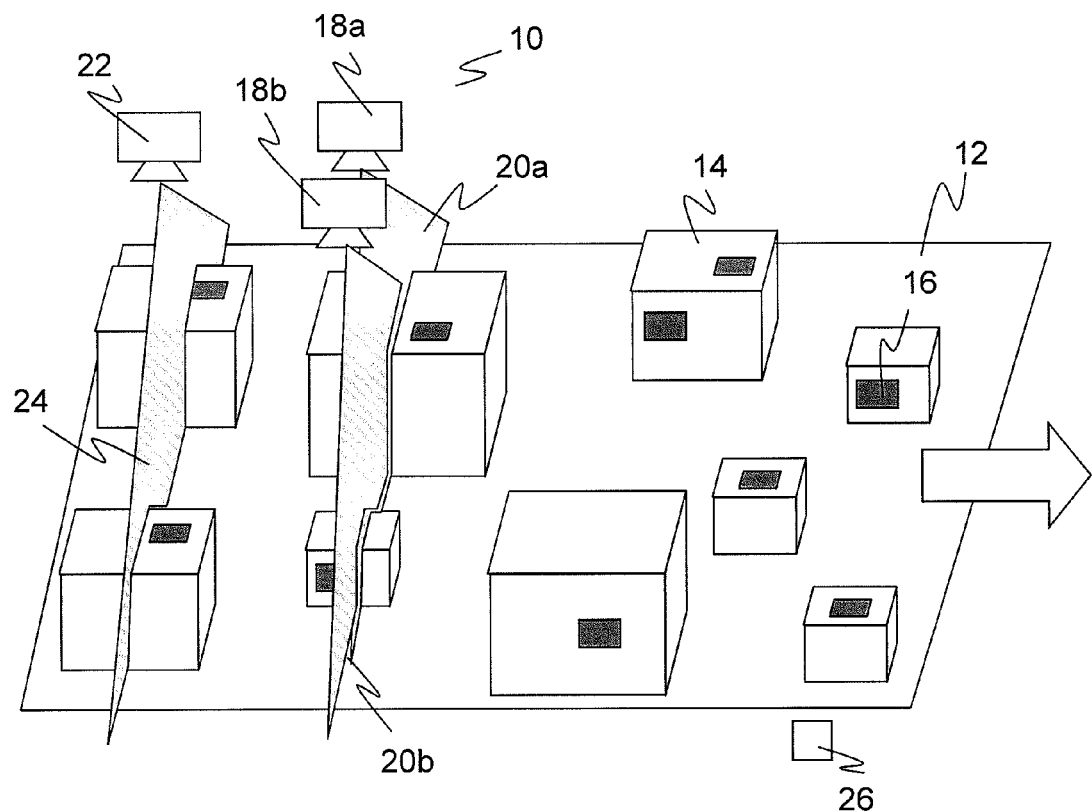

| t0 | f1 | | | |
|---|---|---|---|---|
| t1 | f2 | | | |
| t2 | f3 | | | |
| t3 | f4 | | | |
| t4 | f5 | | | |
| t5 | f6 | f7 | | |
| t6 | f8 | f9 | | |
| t7 | f10 | f11 | | |
| t8 | f12 | | | |
| t9 | f13 | | | |

CAMERA SYSTEM AND METHOD OF DETECTING A STREAM OF OBJECTS

The invention relates to a camera system and to a method for detecting a stream of objects having a plurality of detection units for taking image data of the objects in accordance with the preambles of claims 1 and 13 respectively.

Sensors are used for the automation of processes at a conveyor belt to detect object properties of the conveyed objects and to initiate further processing steps in dependence thereon. The processing is typically a sorting in logistics automation. In addition to general information such as volume and weight of the objects, an optical code applied to the object frequently serves as the most important source of information.

The most widespread code readers are barcode scanners which scan a barcode or line code using a laser reading beam transverse to the code. They are used, for example, at supermarket check-outs, for automatic package identification, for sorting postal shipments or in baggage handling at airports and in other logistics applications. Barcode scanners are increasingly being replaced by camera-based code readers with the further development of digital camera technology. Instead of scanning code regions, a camera-based code reader takes images of the objects having the codes located thereon with the aid of a pixel-resolved image sensor and image evaluation software extracts the code information from these images. Camera-based code readers also cope without problem with different code types than one-dimensional barcodes which also have a two-dimensional structure like a matrix code and provide more information. In an important application group, the objects bearing the code are conveyed past the code reader. A camera, frequently a camera array, reads the object images having the code information successively with the relative movement.

An individual sensor is often not sufficient to take all relevant information on the objects on a conveying belt. A plurality of sensors are therefore combined in a reading system or a reading tunnel. If a plurality of conveyor belts are disposed next to one another to increase the object throughput or if a widened conveyor belt is used, a plurality of sensors mutually complement one another with respect to their fields of view, which are narrow per se, to cover the total width. In addition, sensors are installed at different positions to take codes from all sides (omni reading).

The reading system provides the detected information such as code contents and images of the objects to a master control. These images are used, for example, for an external character recognition, a visualization or a manual postprocessing (video coding). Independently of the exact further processing, the images for this should be in focus, i.e. the cameras of the code readers should be focused on the respective object during the picture taking. This also applies in a completely corresponding manner to an internal use of images within the reading system, for instance in the decoding code contents. It is known to adjust a variable focus setting in the camera in accordance with the object setting for this purpose.

If a plurality of objects are now simultaneously located in the reading zone which require a different focus setting, a camera can only be focused on one of the focal positions. Images of inferior quality are thus produced for objects outside the limited depth of field range and defective readings (no read) of codes can occur. This situation occurs particularly frequently with wider conveyor belts or with a plurality of conveyor belts arranged next to one another.

EP 1 645 839 B1 discloses an apparatus for monitoring moved objects at a conveyor belt which has an upstream distance-measuring laser scanner for detecting the geometry of objects on the conveyor belt and has a line scan camera. Object regions are recognized as regions of interest (ROIs) on the basis of the data of the laser scanner and the evaluation of the image data of the line scan camera is restricted to these regions of interest. Whether the taken object surfaces are located in a depth of field range of the line scan camera is a criterion for the selection of regions of interest. The objects taken only as blurred are thus admittedly identified as such, but this defect cannot be remedied by this.

An optoelectronic code reader is known from DE 102 07 538 A1, wherein a first scanning device and a second scanning device are provided which are controlled for scanning at different focal positions along the scanning direction. If a minimum number of codes is recognized in the reading zone, for example two codes, the two scanning devices are controlled to make a cooperative focus. In this respect, each scanning device focuses on one code and, after a successful reading, on the next code not yet detected by the other scanning device. This therefore requires a direct agreement or an agreement communicated by the common control between the scanning devices. In addition, it is not provided in DE 102 07 538 A1 to process or output the taken image data in a different connection than in the directly carried out internal decoding. It is in addition always assumed that an image line already represents the code content. A joining together of images which were taken at different times or by different sensors is therefore not provided and not necessary.

WO 03/044586 A1 discloses a method for the perspective rectification of images of an object on a conveyor which are taken using a line image sensor. For this purpose, the image line halves are rescaled to a common image resolution by means of image processing, with each image line being processed in two halves. This method deals with a downstream software processing of the image data. The raw data are previously taken with the aid of an autofocus unit. The problem of a simultaneous detection of a plurality of objects with mutually incompatible focal demands is not discussed in WO 03/044586 A1.

EP 1 363 228 B1 describes a code reader having an integrated distance determination which is configured for determining code positions for associating codes with objects. In this respect, in an embodiment, a plurality of objects lie next to one another on a conveyor belt. EP 1 363 228 B1 does not, however, look at the necessity of a different focus for these objects.

It is therefore the object of the invention to improve the simultaneous detection of a plurality of objects of an object stream.

This object is satisfied by a camera system and by a method for detecting a stream of objects comprising a plurality of detection units for taking image data of the objects in accordance with claims 1 and 13 respectively. In this respect, the invention starts from the basic idea of using a plurality of detection units each having an image sensor and a focusing unit and to set the focal positions in a complementary manner in order to take focused image data of as many objects as possible on a simultaneous detection of a plurality of objects. In order also to subject these image data to more complex evaluations than a mere decoding on the basis of an individual image line of an individual detection unit, the image data are composed to form a common image. This composition can comprise two components: on the one hand, in a transverse direction in that the respective parts of image lines of the different detection units detected in focus are joined together to form a common image line; on the other hand, in a longitudinal direction, wherein common image lines are arranged in rows with respect to one another to form a common image.

The raw image data are preferably converted into a common coordinate system for these processes. For this purpose in turn, the position and orientation of the detection units should be known (registration), with this being able to take place by installation instructions or by calibration.

The invention has the advantage that the focal position can also be individually tracked for simultaneously detected objects. This produces focused images of the objects and thus better results in downstream processes to which the common image is output.

The composition and outputting of common images can remain restricted to regions of interest to reduce the data quantity. For example, regions between two objects are as a rule without any relevant information. Large parts of the object surfaces which bear no codes are also especially of no interest for code reading or character recognition (OCR, optical code reading/optical character recognition).

The camera system is preferably configured as a camera-based code reading system. A decoding unit reads out the code content from the image data taken in focus due to the individual focusing. A higher reading rate thereby results since codes from a plurality objects with different focusing demands can also be read simultaneously.

The detection units are preferably arranged next to one another such that their detection zones at least partly overlap and together cover the width of the stream of objects. A common image line therefore effectively arises from a plurality of image lines disposed next to one another with linear detection zones. On the joining together of the common image, the image data of the detection unit which is correctly focused in the respective zone are used in the overlap zone. Such overlap zones can intentionally be selected as very large up to the extreme case of a complete overlap. A greater freedom of choice thereby arises as to which detection unit sets ifs focus onto which of the redundantly detected objects. Outside of the overlap zones, where only one detection unit takes image data, said detection unit necessarily has to focus on an object present there and cannot be assisted by another detection unit.

The evaluation unit is preferably configured to produce a respective one image per object and/or per code arranged at an object from the image data. This image can lie completely in the focused detection zone of a single detection unit, but can also be composed of image data from a plurality of detection units. In addition, the image zone is limited to the object or to the code respectively and optionally to a tolerance environment. Downstream processing steps then have access to a respective focused image per object or code region.

The detection units are preferably separate cameras. The detection units can thereby be installed with flexible positions and in particular spacings from one another to carry out an adaptation to the object stream.

In an alternative preferred embodiment, a plurality of detection units are combined in one camera. A more compact camera system is thereby obtained which comprises all the detection units or a plurality of part systems are obtained which each have some of the detection units, but flexibility is lost with respect to individual detection units.

The camera system preferably has at least one geometry detection sensor to detect a contour of the stream of objects in advance. This is, for example, a distance-measuring laser scanner. The objects, their positions and their dimensions, are thereby known in advance. Sufficient time thus remains to decide in advance which detection unit is responsible for which object and to carry out the required refocusing in good time.

The evaluation unit is preferably configured first to convert image lines to a predefinable resolution on the basis of the object geometry or of the set focal position and only then to compose them to a common image. In contrast to the resolution of the image sensor itself which is determined by the hardware, the predefinable resolution relates to the object, that is to a number of pixels per object dimension or object structure. The latter resolution changes without any conversion with the perspective, that is first depends on the perspective and the object geometry, in particular on the object height or the code position. The object geometry was already taken into account to determine the required focal position so that this focal position also represents a suitable measure for the conversion. To become independent of the perspective resolution differences, a resolution is fixedly predefined and the taken image data are rescaled to it. The conversion therefore represents a kind of digital zoom which, in contrast to a true zoom, is not realized by changing the objective, but rather by a subsequent processing of the image data.

The predefinable resolution is preferably the same for image data of all detection units. Images thus mutually arise of the same resolution of the object structures, whereby a joining together (stitching) is substantially simplified and improved. So that this is always possible, in particular a worst conceivable resolution is in particular predefined as the resolution, that is, for example, the imaginary resolution of the ground or of a conveyor belt on which the objects are located. The digital zoom thus tracks independently of the focal position so that as a result the image resolution becomes constant with a predefined resolution value and thus becomes independent of the focal position and of the detection unit which delivers the image data.

Separate control units are preferably associated with the detection units and are each configured for an autonomous focal strategy for setting the focal position, with the focal strategies being complementary to one another. In this respect, each detection unit has an internal focusing strategy and decides individually for itself which object it focuses on. At the same time, the focal strategies are, however, selected exactly opposite by parameterization or by initial agreement. If a plurality of objects are detected simultaneously, it is thus ensured that a plurality of detection units do not focus on the same object. A camera system having two detection units is best suited for such complementary strategies because then the opposites can be defined particularly clearly; however, it is also conceivable for a plurality of detection units having stepped focusing strategies. The commentary aspect can first result in connection with the arrangement of the detection unit. For example, two detection units can first follow the same strategy of each focusing on the closest object, with it only resulting from the arrangement of the detection units with respect to one another that these objects are not the same.

The complementary focal strategies are preferably defined using at least one of the following criteria: assigned object number, height of the object, distance between the object or the code and the detection unit, required focal adjustment with respect to a preset focus and/or the distance between the optical axis and the object or code. The object number is, for example, assigned to the objects on the basis of previously detected geometry information or the order in the stream of objects. A selection in accordance with the height of the object and the distance between the object and the detection unit often produces the same result. This is, however, not always the case due to the lateral component which is only taken into account in the latter case. In addition, the distance can be related to the code instead of the object. The required focal setting is compared with a preset focus as a reference, for example with a depth of field range at a medium reading height. The actually required refocusing can differ if no position of rest was adopted between two objects. This is, however, not a suitable criterion for an autonomous focal strategy since for this the focal position of the one detection unit must be known to the other detection units.

A common control unit which assigns a respective focal position to the detections units is preferably associated with the detection units. This is therefore the alternative of an external focal prioritization. For example, objects to be detected or focal positions to be set are each assigned centrally to the detection units on the basis of a focus list. This requires more computing and communication effort, but may have the result under certain circumstances due to the greater clarity and the optimization possibilities resulting therefrom in the common control unit that a conflict situation is avoided. For example, the common control unit can provide that, if no free detection unit is available for an additional object which could be focused on this object, an object is first assigned to at least one adjacent detection unit, said object requiring a similar focal position and thus still detecting the additional object more or less in focus.

The method in accordance with the invention can be further developed in a similar manner and shows similar advantages in so doing. Such advantageous features are described in an exemplary, but not exclusive manner in the subordinate claims dependent on the independent claims.

Figure 2:
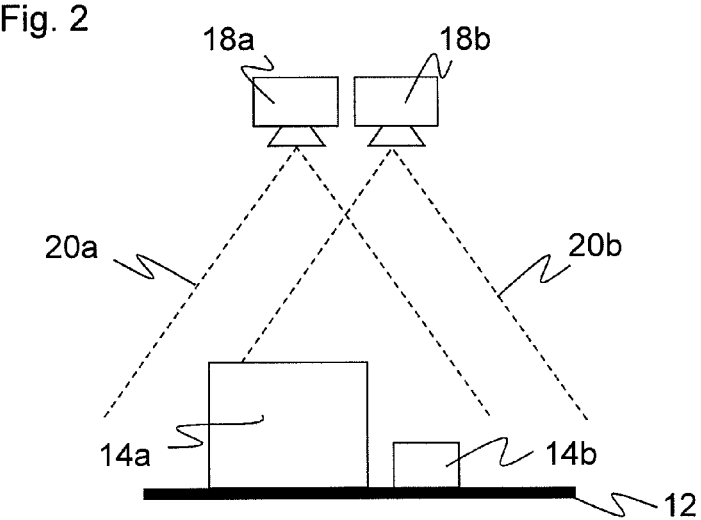
Figure 3A:
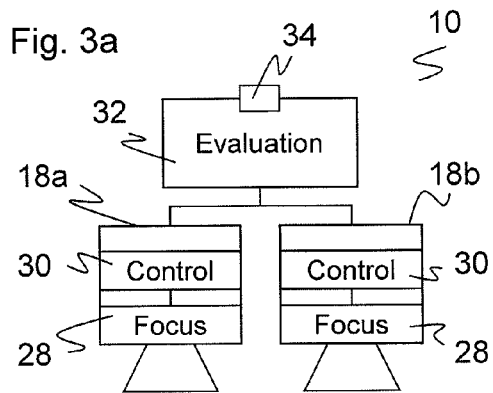
Figure 3B:
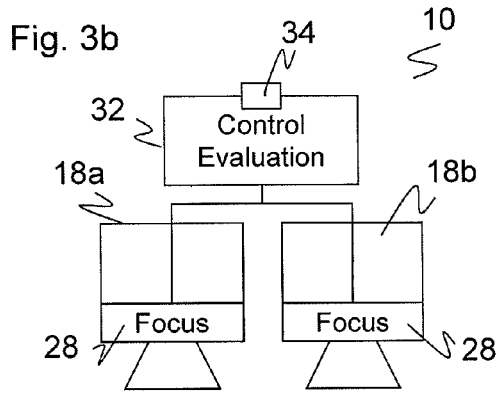
Figure 4A:
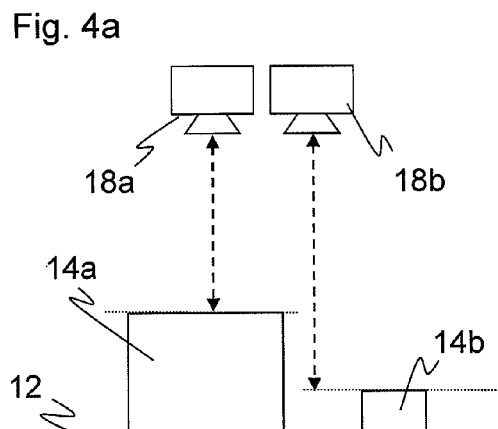
Figure 4B:
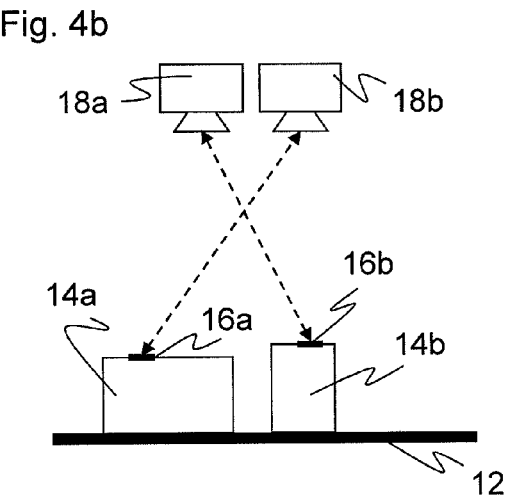
Figure 4C:
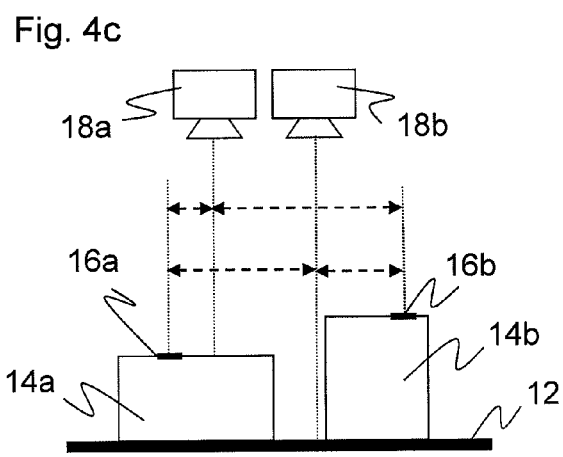
Figures 5A, 5B:
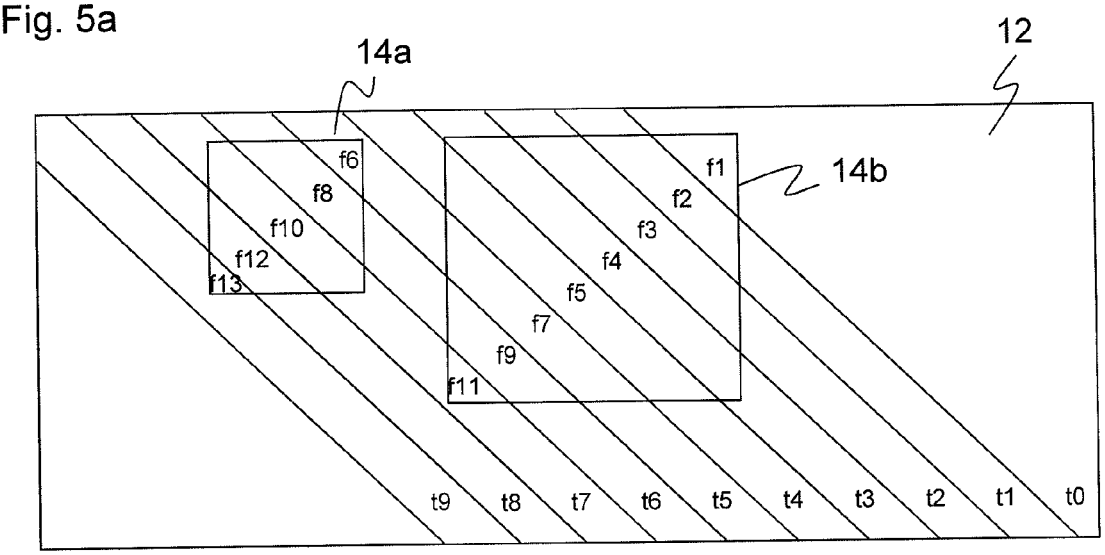

The invention will be explained in more detail in the following also with respect to further features and advantages by way of example with reference to embodiments and to the enclosed drawing. The Figures of the drawing show in:

FIG. 1 a schematic three-dimensional plan view of a camera system at a conveyor belt having objects to be detected;

FIG. 2 a sectional view through the view in accordance with FIG. 1 in a detection plane of the camera system;

FIG. 3*a* a very simplified block representation of an embodiment of a camera system with a decentralized cooperative focal tracking;

FIG. 3*b* a very simplified block representation of an embodiment of a camera system with a central cooperative focal tracking;

FIG. 4*a* a sectional representation of a camera system above two objects for explaining a focusing strategy based on the object height;

FIG. 4*b* a sectional representation of a camera system above two objects for explaining a focusing strategy based on a distance between the object or the code and the detection unit;

FIG. 4*c* a sectional representation of a camera system above two objects for explaining a focusing strategy based on a distance between the optical axis of the detection unit and the object or the code;

FIG. 5*a* a schematic plan view of two objects on a conveyor belt having a position of image lines taken sequentially at different times; and FIG. 5*b* a focus table derived from the times in accordance with FIG. 5*a*.

FIG. 1 showed a schematic three-dimensional plan view of a camera system 10 at a conveyor belt 12 with objects 14 to be detected onto which codes 16 have been applied. The conveyor belt 12 is an example for the production of a stream of objects 14 which move relative to the stationary camera system 10. Alternatively, the camera system 10 can be moved or the objects 14 move by another means or by their own movement with a stationary installation of the camera system 10.

The camera system 10 comprises two camera-based code readers 18*a-b*. They each have an image sensor, not shown, having a plurality of light reception elements, arranged to form a pixel row or a pixel matrix, as well as a lens. The code readers 18*a-b* are thus cameras which are additionally equipped with a decoding unit for reading out code information and corresponding preprocessing routines for locating and preparing code regions. It is also conceivable to detect streams of objects 14 without codes 16 and accordingly to dispense with the decoding unit itself or its use. The code readers 18*a-b* can be either separate cameras or detection units within the same camera.

In the example of FIG. 1, the detection zones 20*a-b* of the code readers 18*a-b* are angular sections of a plane. At one time, an image line of the objects 14 on the conveyor belt 12 are accordingly detected and successive image lines are arranged in rows during the movement of the conveyor belt to obtain an overall image. If, deviating from this, the image sensors of the code readers 18*a-b* are matrix sensors, the image can selectively be composed of flat sections or selected lines of the matrix or snapshots are taken and are individually evaluated.

The detection zones 20*a-b* largely overlap in the transverse direction of the conveyor belt 12. In other embodiments, a smaller overlap, or also a larger overlap up to complete coverage, are conceivable. Additional code readers can also be used whose detection zones then overlap pair-wise or in larger groups. The image data are available redundantly in the overlap regions. This can be utilized to compose common image lines in which the respective image data of the pixel or section are used which are more in focus.

A geometry detection sensor 22, for example in the form of a distance-measuring laser scanner known per se whose detection zone covers the whole conveyor belt 12 is arranged above the code readers 18*a-b* with respect to the direction of movement of the conveyor belt 12. The geometry detection sensor 22 measures the three-dimensional contour of the objects 14 on the conveyor belt 12 so that the camera system 10 is already aware of the number of objects 14 as well as their positions and shapes or dimensions before the detection process of the code readers 18*a-b*. A laser scanner has a very large angle of view so that wide conveyor belts 12 can also be detected. Nevertheless, in another embodiment, additional geometry sensors can be arranged next to one another to reduce shadowing effects through different object heights.

An encoder 26 is furthermore provided at the conveyor belt 12 for determining the advance or the speed. Alternatively, the conveyor belt moves reliably with a known movement profile or corresponding information is transmitted to the camera system by a master control. The respective advance of the conveyor belt 12 is required to compose the slice-wise measured geometries with the correct dimension to form a three-dimensional contour and the image lines to form a total image and s that the associations are maintained despite the constant movement of the conveyor belt 12 during the detection and also up to the outputting of the detected object information and code information beneath the detection position. The objects 14 are tracked for this purpose on the basis of the advance from the first detection onward. As described in the introduction, further sensors, not shown, can be attached from another perspective to detect geometries or codes from the side or from below.

FIG. 2 shows a sectional view through the plane of the detection zones 20*a-b* of FIG. 1. In this respect, the same reference numerals here and in the following designate the same or mutually corresponding features. The two objects 14*a-b* have considerably different heights. If, for example, the code reader 18*a* is focused on the upper side of the object 14*a*, the object 14*b* is thus outside the depth of field range and the code reader 18a does not take any focused image data of the object 14b. The two code readers 18a-b therefore work with a cooperative focusing. In the named example, care must be taken that the code reader 18b focuses on the flat object 14b.

FIG. 3 shows a very simplified block representation of the camera system 10. Each code reader 18a-b has an adjustable focusing unit 28, that is a reception optics with an electronically adjustable focal position. The embodiment in accordance with FIG. 3a is configured for an autonomous internal focusing strategy. For this purpose, each code reader 18a-b has its own control 30 which decides on the respective focus to be adopted. In the embodiment in accordance with FIG. 3b, in contrast, the focal strategy is coordinated in a common control and evaluation unit 32. Mixed forms are furthermore conceivable in which first the code readers 18a-b themselves decide on a focal position, but a central control checks this decision and intervenes to make a correction where necessary.

In both embodiments according to FIG. 3, the evaluation unit 32 composes the incoming image data so that the respective image zones in focus form a common image line. After an evaluation has taken place, image data, for example one image per object, and further information such as the volume of the object, read code information and the like are output via an outlet 34 to a master control. Where necessary, all spatially dependent information as well as sensor positions are converted into a common coordinate system.

If the code readers 18a-b work with different focal positions, the object-related resolution of the taken image lines differs. For, as can easily be seen from the example of FIG. 2, the flat object 14b is further away from the code reader 18b than the object 14a from the code reader 18a. An image line of the object 14b therefore contains fewer pixels per object structure, in particular a code region, than an image line of the object 14a. To compensate this difference, in an embodiment of the invention, an adaptation of the image resolution is provided by postprocessing in the evaluation unit 32. In this respect, a desired resolution is predefined, for example a resolution which is also achieved under the worst assumption, namely here for the spacing of the conveyor belt 12 itself. The image lines of each code reader 18a-b are then rescaled to the desired resolution individually and with a different factor which depends on the different focal position. The effector corresponds to an individual digital zoom of the two code readers 18a-b. The joining together (stitching) of such image lines with the same resolution is a lot easier and produces better results.

In the following, the internal focusing strategy will be explained in an embodiment of the camera system 10 in accordance with FIG. 3a with reference to FIGS. 4a-c which each show in sketch form a section through the detection plane of the code readers 18a-b similar to FIG. 2. The criteria of the presented focusing strategies are described individually, but can also be combined with one another in mixed forms.

The geometries of the objects 14 are known to the code readers 18a-b from the geometry detection sensor 22. Alternatively, the code readers 18a-b measure the geometry themselves using an internal distance determination. However, under certain circumstances, this results in interfering transition effects since the correct focal position cannot be adopted in advance.

Each code reader 18a-b now determines for itself on the basis of the set internal focusing strategy which object 14 is used with which focal position at which time. As long as only one respective object 14 is located in the detection zone 20a-b at the same time, no conflicts can occur. However, as soon as objects could also lie next to one another in the detection direction at a conveyor belt 12, complementary focusing strategies are to be selected for the code readers 18a-b. This can be done by suitable parameterization or by a communication of the separate setting between the code readers 18a.

A simple complementary strategy is oriented on object numbers which are assigned to the objects 14 after their first detection by the geometry sensor 22. The numbering expediently takes place in the order in which the objects 14 are going to enter into the detection zone 20a-b of the code readers 18a-b. The one code reader 18a is then, for example, responsible for even objects 14 and the other code reader 18a is responsible for odd objects 14. The code reader 18a parameterized to even objects 14 then switches to an object 14 having an even object number when it is reliably recognized in its detection zone 20a. This means that the individual focal points for the new object 14 to be focused only change within the parameterized hysteresis. The code reader 18a thereby switches its focal position prematurely over to this object 14, independently of whether the reading task for the current object 14 is satisfied. The same condition applies accordingly to odd object numbers.

A further complementary strategy is illustrated in FIG. 4a and uses the parallel spacing between the object 14a-b and the code reader 18a-b which is given by the height of the objects 14a-b due to the fixed installation height of the code readers 18a-b. This focusing strategy becomes complementary when a code reader 14b focuses the highest object 14a-b and the other code reader 14b the flattest object 14a-b.

In the focusing strategy illustrated in FIG. 4b, the radial distance serves as the criterion instead of the parallel distance. Since here a surface directed to the code reader 18a-b can generally no longer be anticipated, a reference point is additionally selected on the object 14. This can, for example, be a center of gravity of the upper surface, an object edge or an object corner or, as drawn in FIG. 4b, the position of a code 16a-b. Such reference points are also alternatively used in the focusing strategies still to be described. The radial next object 14a-b and the parallel next object 14a-b frequently, but not always, coincide. If the code readers 18a-b are installed close to one another, the focusing strategy becomes complementary when one code reader 14a focuses on the closest object 14a-b and the other code reader 14b focuses on the furthermost object 14a-b. On a larger distance between the code readers 14a-b, it may instead be necessary that both code readers 18a-b select the respective closest object 14a-b from their view point and thus use the same strategy.

In an embodiment not shown, focusing takes place on that object 18a-b which has the smallest or the largest distance from a preset focus. This preset focus is a position of rest into which the code readers 18a-b return when no object 18a-b is detected.

FIG. 4c again shows a variant which can use a focusing strategy, namely the distance with respect to the optical axis of the code readers 18a-b. In this respect, the object 14a-b lying furthest to the right or the object 14a-b lying furthest to the left can be focused on. It is also conceivable to select the object 14a-b positioned most central or least central, i.e. only to evaluate the amount of the distance from the optical axis of the code readers 18a-b.

Alternatively to an individual focusing strategy, the required focal positions are assigned centrally in the embodiment in accordance with FIG. 3b. This will now be explained with reference to FIG. 5. The central focusing strategy can, however, also instead or additionally use the just-described criteria for the internal focusing strategies.

FIG. 5a shows a schematic plan view of two objects 14a-b on the conveyor belt 12. The pattern of the image lines taken by the code readers 18a-b is indicated by lines. The image lines are oriented to on the conveyor belt 12. This orientation does not play any role as long as the conveyor belt 12 is detected in the full width and a perpendicular orientation as in FIG. 1 is also possible instead. Two times t0 to t9 are associated with the image lines. A focal position to be set in accordance with the geometry of the objects 14a-b is designated by f1 to f13.

FIG. 5b represents a focus table derived from the times in accordance with FIG. 5a. The focal positions f1 to f13 and the focus table are prepared centrally, for example in the control and evaluation unit 32 or in a focus master, based on the data of the geometry detection sensor 22. The control and evaluation unit 32 distributes the focusing tasks based on the focus table. As long as there is only one entry in a line, this means that only one object 14a-b is detected at one time. The control and evaluation unit 32 can therefore select any desired one of the two code readers 18a-b and instruct it to set this focal position. This association expediently does not change constantly, but the code reader 18a-b once selected for an object 14a-b is instructed to carry out tracking. The other code reader 18a-b can likewise be focused on the object for acquiring redundant data.

This applies to the times t0 to t4 and to the focal positions f1 to f5 so that, for example, the code reader 14a focuses on the object 14b at the instruction of the control and evaluation unit 32 and tracks its focus in the focal positions f1 to f5. As soon as both objects 14a-b are detected simultaneously at the time t5, the line at 15 in the focus table accordingly comprises two entries, the other code reader 14b is instructed to focus on the second object 14a having the focal position f6, while the code reader 14a previously focused on the object 14b continues the focal tracking of this object 14b having the focal position f7. From the next time t6 onward, both code readers 14a-b track the focusing on the assigned object 14a-b having the focal positions f8, f9. At the time t8, the code reader 18a focused on the object 14b can move into a preset focus and would then be available for a new object 14 or is focused on the other object 14a for a redundant image detection. The object 14b can now be deleted from the focus list. The same applies accordingly to the code reader 18b and to the object 14a after the time t9.

The currently set focal position is always determined by the oldest entry in the focus table. The focal position is set as fast as possible for the then active object 14 and is continuously updated if changes occur due to the geometry detection. If a plurality of objects 14a-b are located in the detection zone 20a-b, the focusing of the individual code readers 18a-b is predefined by the focus master. The object release can take place by reading the code 16 on the object 14, that is by satisfying the reading condition, by the code reader 18a-b itself after the object 14 has left the detection zone 20a-b, or by reaching a defined focus release point.

As long as the active object has not yet reached the visible range, the code readers 18a-b can remain in the preset focus. The preset focus is preferably parameterizable and is set to a value, for example, which optimally utilizes the depth of field range, for instance so that the reading range ends exactly at the height of the conveyor belt 12. When an object enters into the detection zone 20a-b of the code readers 18-b, the distance values are then used in accordance with the geometry data or the focal positions derived therefrom, with the transition being able to be preplanned to compensate delays by the changing of the focal position.

Conversely, on the focus release, that is when the object 14 has left the detection zone 20a-b, when reading has been successful or when the focus release point has been reached, the focal position is set to the next object 14 in the list. If the focus list displays that currently no object 14 can be detected, a reset takes place to the preset focus or simply a maintaining of the last focal position.

A sharp focusing on all objects 14 can only be ensured if at no time more objects are simultaneously detected than code readers 18a-b are present. But even if excess objects 14 cannot be focused on individually, the number of objects 14 not detected in focus can nevertheless be reduced by the plurality of focal positions. It is moreover conceivable that the focal positions are used sensibly to detect a number of objects at least practically in focus which is as large as possible. For this purpose, the simultaneously detected objects are classified into so many groups as code readers 18a-b are present and this group division takes place just so that at least one object 14 of each group is sufficiently in focus with a suitable focal position and, where possible, also further objects 14 lie in the respective depth of field range or are at least not spaced far apart therefrom.

The invention claimed is:

1. A camera system (10) for detecting a stream of objects (14) moved relative to the camera system (10), the camera system (10) comprising a plurality of detection units (18) each having an image sensor and a focusing unit (20);
    at least one control unit (30, 32) to set the focal positions of the detection units (18) in a complementary manner on a simultaneous detection of a plurality of objects (14) such that as many objects (14) as possible are detected in focus by at least one detection unit (18); and
    an evaluation unit (32) which is configured to compose image data of the detection units (18) to form a common image.

2. The camera system (10) in accordance with claim 1, the camera system being a camera-based code reading system.

3. The camera system (10) in accordance with claim 1, wherein the detection units (18) are arranged next to one another such that their detection zones (20) at least partly overlap and together cover the width of the stream of objects (14).

4. The camera system (10) in accordance with claim 1, the evaluation unit (32) being configured to produce a respective one image per object (14) and/or per code (16) arranged at an object (14) from the image data.

5. The camera system (10) in accordance with claim 1, wherein the detections units (18) are separate cameras.

6. The camera system (10) in accordance with claim 1, wherein a plurality of detection units (18) are combined in a camera.

7. The camera system (10) in accordance with claim 1, further comprising at least one geometry detection sensor (22) to detect a contour of the stream of objects (14) in advance.

8. The camera system (10) in accordance with claim 1, the evaluation unit (32) being configured first to convert image lines to a predefinable resolution based on the object geometry or on the set focal position and only then to compose them to form a common image.

9. The camera system (10) in accordance with claim 8, wherein the predefinable resolution for image data is the same for all detection units (18).

10. The camera system (10) in accordance with claim 1, further comprising separate control units (30) which are associated with the detection units (18) and which are each configured for an autonomous focal strategy for the setting of the focal position, with the focal strategies being complementary to one another.

11. The camera system (10) in accordance with claim 10, wherein the complementary focal strategies are defined based on at least one of the following criteria:
assigned object number,
height of the object (14),
distance between the object (14) or the code (16) and the detection unit (18),
required focal adjustment with respect to a preset focus and/or distance between the optical axis and the object (14) or the code (16).

12. The camera system (10) in accordance with claim 1, further comprising a common control unit (32) which assigns a respective one focal position to the detection unit (18) and which is associated with the detection units (18).

13. A method for detecting a stream of objects (14) having a plurality of detection units (18) for taking image data of the objects (14), comprising the steps of:
setting the focal positions of the detection units (18) complementary to one another such that as many objects (14) as possible are detected in focus on a simultaneous detection of a plurality of objects (14) in a detection unit (18) in that different detection units (18) set their focal positions to different objects (14); and
composing image data of the detection units (18) to form a common image.

14. The method in accordance with claim 13, further comprising the step of:
first converting image lines to a resolution predefinable with respect to the detected object (14) based on a previously detected object geometry; and only then composing image data to form a common image.

15. The method in accordance with claim 14, wherein the step of converting image lines includes the step of setting the same predefinable resolution for all detection units (18).

16. The method in accordance with claim 13, further comprising the step of:
autonomously setting the respective focal position in the detection units (18) on the basis of mutually exclusive criteria.

17. The method in accordance with claim 13, further comprising the steps of:
centrally determining the focal positions on the basis of the simultaneously detected objects (14) and
predefining the focal positions for the detection units (18).

* * * * *